United States Patent [19]

Fisher

[11] 4,364,579
[45] Dec. 21, 1982

[54] ROCK AND ROLL RECREATIONAL TOY

[76] Inventor: John A. Fisher, 2458 Red Apple Dr., Dayton, Ohio 45431

[21] Appl. No.: 283,013

[22] Filed: Jul. 13, 1981

[51] Int. Cl.³ .................. B62K 1/000; A63G 29/000
[52] U.S. Cl. .................................... 280/206; 272/115
[58] Field of Search ............... 280/206, 205, 08, 207, 280/29; 272/52, 57, 33 R, 1 B, 1 R, 115, 85, 58

[56] References Cited

U.S. PATENT DOCUMENTS

| | | | |
|---|---|---|---|
| 1,521,133 | 12/1924 | Tinker | 280/206 |
| 2,943,531 | 7/1960 | Bentley | 356/240 |
| 3,338,593 | 8/1967 | Gehring | 280/206 |
| 3,575,443 | 4/1971 | Aguilar | 280/206 |
| 3,905,617 | 9/1975 | Smith | 272/1 R X |

Primary Examiner—Robert R. Song
Assistant Examiner—M. J. Hill
Attorney, Agent, or Firm—Penrose, Lucas, Albright, Mason, Mason & Albright

[57] ABSTRACT

An amusement toy comprising an annular body which has an outer peripheral surface containing profiled hoop edge portions at its outboard edges which are joined by a squat barrel-shaped portion, such edge portions being integral with vertical side wall portions which are somewhat bulged in an outboard direction and which terminate at an inner rim. A gripping bar joins the rims and a cover is rigidly connected across the rims which bulges inwardly towards the center of the toy to form with peripheral surfaces a channel of about 120° of arc, the end of the channel being about 30° of arc from the bar. All parts of the toy except the gripping bar are composed of a rigid resin material and all surfaces are compound curves. A person who places himself in the channel and holds onto the gripping means is capable of causing the toy to rock on a level surface and by sufficient rocking to roll over whereby the cover joining the rims holds the person within the channel.

12 Claims, 4 Drawing Figures

ROCK AND ROLL RECREATIONAL TOY

BACKGROUND OF THE INVENTION

The present invention relates to a recreational toy for children and more specifically to an amusement device of this nature in which the occupant may rock the toy forward and backward and possibly cause the toy to make a complete roll.

Recreational toys of the general nature of the instant invention are known. They have not, however, become overly popular because of certain inherent shortcomings. For example, it has been recognized that such toys should be safe to use by small children as well as provide both entertainment and exercise. For the purpose of safety, some such toys have seat belts to hold the occupant in place. However, a seat belt requires the affirmative act of buckling or otherwise securing which may be neglected by small children.

Another problem relates to the stability of the toy and the protection which it provides to its occupant. Many such toys have two circular rims connected by a plurality of cross-bars or the like or are cylindrical and of generally the same cross-section from edge-to-edge. Where, in effect, two joined wheels are used, the possibility exists of the body or head of the occupant inadvertently to impact with the underlying surface or a rock or the like. If, on the other hand, the device has a rim of considerable width, its friction is increased relative to the underlying surface and a single broad rim is more likely than two parallel rims to tip when encountering obstacles which two rims would straddle.

As a result of the foregoing and other problems, there has developed and continues to exist a need for a recreational toy which is safe to use even by small children, is inexpensive, and provides both entertainment and exercise. Despite this need and efforts of many to provide for such a toy, a safe, rock and rolling type toy of the type involved has not been generally available.

Attention is invited to the following U.S. patents which are considered disclose the state-of-the-art for various types of toys of the type involved:

U.S. Pat. No. 91,535: Green et al
U.S. Pat. No. 92,044: Hale
U.S. Pat. No. 287,989: Albert
U.S. Pat. No. 299,617: Burlinghausen
U.S. Pat. No. 304,023: Peck
U.S. Pat. No. 792,403: Crosse
U.S. Pat. No. 1,521,133: Tinker
U.S. Pat. No. 1,676,015: Feick
U.S. Pat. No. 1,829,266: Drew et al
U.S. Pat. No. 2,654,418: Bisner et al
U.S. Pat. No. 2,923,545: Lytle
U.S. Pat. No. 2,948,531: Johnson
U.S. Pat. No. 2,953,394: Anderson
U.S. Pat. No. 3,013,806: Boyd
U.S. Pat. No. 3,066,951: Gray
U.S. Pat. No. 3,083,979: Boyd
U.S. Pat. No. 3,156,486: Fenwick
U.S. Pat. No. 3,260,324: Suarez
U.S. Pat. No. 3,334,915: Sulyma et al
U.S. Pat. No. 3,338,593: Gehring
U.S. Pat. No. 3,371,943: Turgetto
U.S. Pat. No. 3,806,156: Tidwell
U.S. Pat. No. 3,428,015: Cloud
U.S. Pat. No. 3,464,718: Fisher
U.S. Pat. No. 3,537,726: Conover
U.S. Pat. No. 3,575,443: Aguilar
U.S. Pat. No. 3,779,201: Spahn
U.S. Pat. No. 3,905,617: Smith
U.S. Pat. No. 4,141,588: Anderson
U.S. Pat. No. 4,154,188: Flagg It will be noted the patents to Sulyma et al, Lytle and Fenwick disclose devices wherein a seat belt is provided to hold the occupant in place. The concept of providing a pair of rim members is shown, for example, in FIG. 4 of the Conover patent.

SUMMARY OF THE INVENTION

A passenger carrying rock and roll type toy in accordance with the present invention appears from the side somewhat the same as a pneumatic tire. However, as seen from the front, it has two spaced-apart rim-like members along which the toy is rolled. The toy is constructed from a rigid resin material and, extending from one inner periphery to the other, is a bar for holding by the occupant. Part of the interior of the wheel is covered by a resin material transversely across its inner peripheries to provide a channel-like space between the outer and inner peripheries for the child. In operation, the child places himself into such space and grasps the bar or holding device. Then, by manipulation, he causes the toy to rock and possibly roll over in which case the child is held in the toy by the covering material across the inner peripheries.

The toy is 100% (except for the cross-bar) constructed of compound curves to provide an exceeding strong and, at the same time, relatively light toy.

Other objects, adaptabilities and capabilities of the invention will be understood by those skilled in the art as the description progresses, reference being had to the accompanying drawings in which:

DESCRIPTION OF THE PREFERRED EMBODIMENTS

Figure 1:
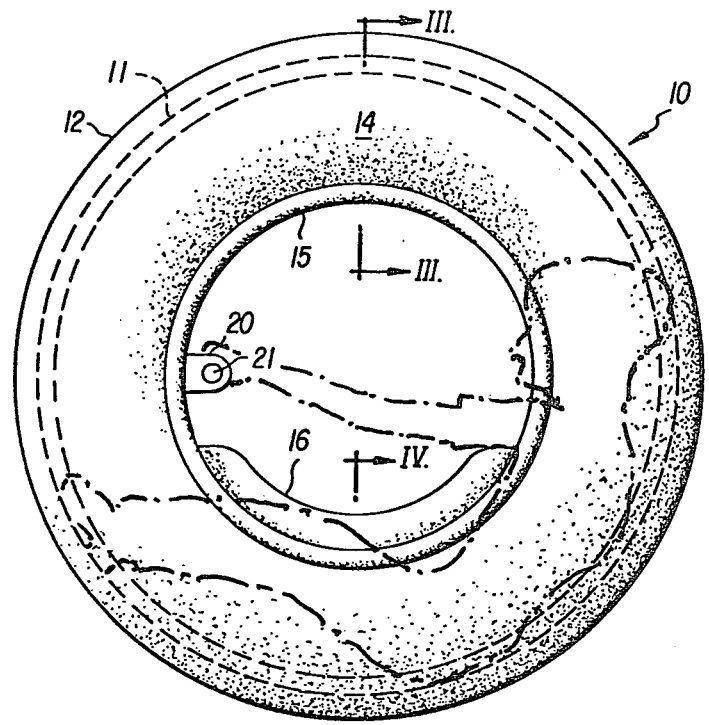
FIG. 1 is a side elevational view of the toy wheel of the invention.
Figure 2:
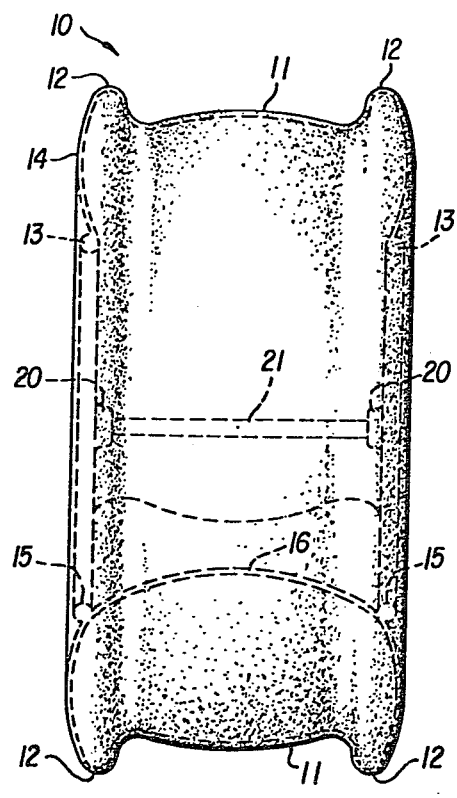
FIG. 2 is a front elevation of the invention.
Figure 3:
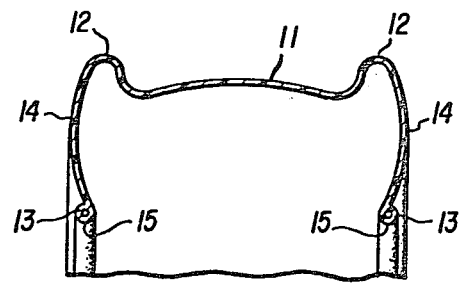
FIG. 3 is a sectional view taken on lines III—III of FIG. 1.
Figure 4:
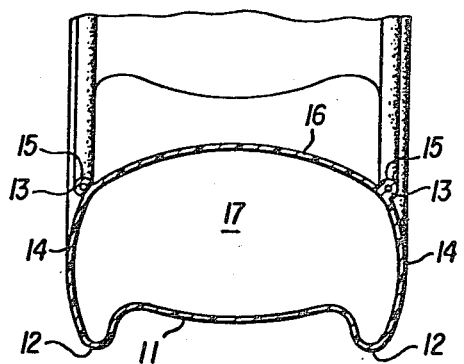
FIG. 4 is a sectional view taken on lines IV—IV of FIG. 1.

The toy wheel, as seen in FIG. 1, is intentionally formed, marked and colored to simulate a vehicle tire as seen from the side. Such wheel, designated generally by reference numeral 10 is preferably thirty-six inches in overall diameter and has a width of eighteen inches. The opening is preferably about one-half the overall diameter of the wheel or slightly larger.

Referring to the Figures, it will be noted the body of wheel 10 comprises an outer peripheral surface 11 which includes a pair of spaced-apart profiled hoop edge portions 12. Extending inwardly from edge portions 12 are a pair of side wall portions 14 which terminate beads 13 on the inward side of a pair of inner rim means 15.

Extending through an arc of about 120° relative to the axis of rotation of wheel 10 is a restraining means comprising a tubular wall 16 which, together with side wall portions 14, peripheral surface 11, including edge portions 12, defines a body channel 17.

Rigidly connected to rim means 15 and extending inwardly therefrom are a pair of holding devices 20 which rigidly secure between them gripping means comprising a transverse bar 21 which is about 30° of arc from the adjacent edge of wall 16.

Except for bar 21 which is preferably composed of a metal such as aluminum or steel, wheel 10 is preferably composed throughout of a rigid resin material which has been molded in two or three pieces and to which the bar has been secured, the unit being thus essentially integral and rigid.

The above construction provides lateral stability whereby the wheel 10 does not tip sidewise easily from an upright rolling position. In operation as indicated in dot-dash lines in FIG. 1, the child places himself within the wheel with his body in the channel 17 under the tubular wall 16, with his head and shoulders between side walls 14 (opposite bar 21), and with his arms extending towards the center of wheel 10 and his hands firmly grasping bar 21. Then by moving his body forward and backward, it is possible for him to cause the wheel to rock on a smooth level surface. By proper timing, he may increase the rocking motion until he nears the top of the wheel with his body being held in channel 17 by means of wall 16. It is even possible for him to increase the rocking motion to make the wheel roll over one or more complete revolutions. Due to the protection provided by the peripheral surface 11 and side walls 14, the child is never exposed to contact with the ground, being held in channel 13 adjacent the interior of the peripheral surface 11 by the tubular wall 16. Nevertheless, by holding bar 21 and moving his body, the child is able to shift his weight to cause a rocking and rolling motion within limits, as desired.

Although a molded resin body is preferred for wheel 10, other material such as metal or wood may be used. For example, wheel 10 may be two wooden or metal disc connected with a suitably strong cylindrical portion and having a further interior cylindrical portion serving as wall 16. Such construction, although it exhibits many of the advantages of the foregoing described embodiment, is not preferred over such embodiment because of weight and strength advantages imparted by the compound curves in such first embodiment.

Although I have described the preferred embodiment of my invention, it is to be understood it is capable of other adaptations and modifications within the scope of the appended claims.

Having described my device, what I claim as new and to be secured by Letters Patent of the United States is:

1. A rock and roll amusement toy comprising an annular body, said body having an outer periphery surface with a pair of spaced-apart profiled hoop edge ground engaging portions that have the same diameter and are joined by a generally cylindrical portion having a smaller diameter than said edge portion, each of said edge portions being connected to a respective side wall portion, each said wall portion terminating in a respective inner rim, gripping means joining said rims, and restraining means joining said inner rims proximate said gripping means, said restraining means defining a sector of annular space for receiving and surrounding the front, sides and back of a person who by holding said gripping means with his arms extending over said annular space is capable of causing said body to rock on a level surface and by rocking to roll over.

2. An amusement toy in accordance with claim 1, wherein said side wall portions have a substantially uniform thickness and comprise compound curves.

3. An amusement toy in accordance with claim 2, wherein said annular body is composed of a resin material.

4. An amusement toy in accordance with claim 2, wherein said gripping means comprises a bar which is mounted on said inner rims by holding devices which extend inwardly of said inner rim.

5. An amusement toy in accordance with claim 4, wherein said body is composed on a non-metallic material, said bar is composed of metal and extends only between said holding devices.

6. An amusement toy in accordance with claim 1, wherein said restraining means extends in through an arc of about 120° relative to the axis of rotation of the toy.

7. An amusement toy in accordance with claim 6, wherein said gripping means comprises a horizontal bar which is displaced from one end of said restraining means by an arc of about 30° relative to the axis of rotation of the toy.

8. An amusement toy in accordance with claim 1, wherein said restraining means has the configuration of a saddle-shaped compound curve.

9. An amusement toy in accordance with claim 1, wherein said outer periphery surfaces between said profiled hoop edge portions and said inner rims comprise compound curves.

10. An amusement toy in accordance with claim 1, having an overall diameter which is about double its overall width.

11. An amusement device in accordance with claim 10, wherein said overall diameter is about thirty-six inches and wherein said overall width is about eighteen inches.

12. An amusement toy in accordance with claim 10, wherein the diameter of each said inner rim is about one-half the overall diameter of the toy.

* * * * *